United States Patent
Chow et al.

(10) Patent No.: US 12,198,295 B2
(45) Date of Patent: Jan. 14, 2025

(54) PARALLELIZATION OF CONVOLUTION OPERATIONS

(71) Applicant: Advanced Micro Devices, Inc., Santa Clara, CA (US)

(72) Inventors: Michael Y. Chow, Santa Clara, CA (US); Vidyashankar Viswanathan, Boxborough, MA (US); Richard E. George, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 397 days.

(21) Appl. No.: 17/565,301

(22) Filed: Dec. 29, 2021

(65) Prior Publication Data
US 2023/0206395 A1 Jun. 29, 2023

(51) Int. Cl.
*G06T 3/40* (2024.01)
*G06F 17/15* (2006.01)
*G06T 3/4046* (2024.01)

(52) U.S. Cl.
CPC .......... *G06T 3/4046* (2013.01); *G06F 17/153* (2013.01)

(58) Field of Classification Search
None
See application file for complete search history.

(56) References Cited

U.S. PATENT DOCUMENTS

| | | | |
|---|---|---|---|
| 2018/0315165 A1* | 11/2018 | Navarrete Michelini | G06T 3/4046 |
| 2020/0126186 A1* | 4/2020 | Kim | G06N 3/084 |
| 2020/0380639 A1* | 12/2020 | Rossi | G06T 3/4046 |
| 2021/0390660 A1* | 12/2021 | Baek | G06T 5/00 |
| 2023/0140890 A1* | 5/2023 | Tyagi | G06N 3/0464 342/175 |

OTHER PUBLICATIONS

Ledig, C., et. al., "Photo-Realistic Single Image Super-Resolution Using A Generative Adversarial Network", arXiv:1609.04802v5, 19 pgs., May 25, 2017.

* cited by examiner

*Primary Examiner* — Akwasi M Sarpong
*Assistant Examiner* — Pawan Dhingra
(74) *Attorney, Agent, or Firm* — Volpe Koenig

(57) ABSTRACT

A technique for performing convolution operations is disclosed. The technique includes performing a first convolution operation based on a first convolutional layer input image to generate at least a portion of a first convolutional layer output image; while performing the first convolution operation, performing a second convolution operation based on a second convolutional layer input image to generate at least a portion of a second convolutional layer output image, wherein the second convolutional layer input image is based on the first convolutional layer output image; storing the portion of the first convolutional layer output image in a first memory dedicated to storing image data for convolution operations; and storing the portion of the second convolutional layer output image in a second memory dedicated to storing image data for convolution operations.

17 Claims, 7 Drawing Sheets

PARALLELIZATION OF CONVOLUTION OPERATIONS

BACKGROUND

Convolution operations are useful in many types of image processing algorithms such as those used in artificial intelligence networks. Improvements to such operations are constantly being made.

BRIEF DESCRIPTION OF THE DRAWINGS

A more detailed understanding can be had from the following description, given by way of example in conjunction with the accompanying drawings wherein.

DETAILED DESCRIPTION

A technique for performing convolution operations is disclosed. The technique includes performing a first convolution operation based on a first convolutional layer input image to generate at least a portion of a first convolutional layer output image; while performing the first convolution operation, performing a second convolution operation based on a second convolutional layer input image to generate at least a portion of a second convolutional layer output image, wherein the second convolutional layer input image is based on the first convolutional layer output image; storing the portion of the first convolutional layer output image in a first memory dedicated to storing image data for convolution operations; and storing the portion of the second convolutional layer output image in a second memory dedicated to storing image data for convolution operations.

Figure 1:
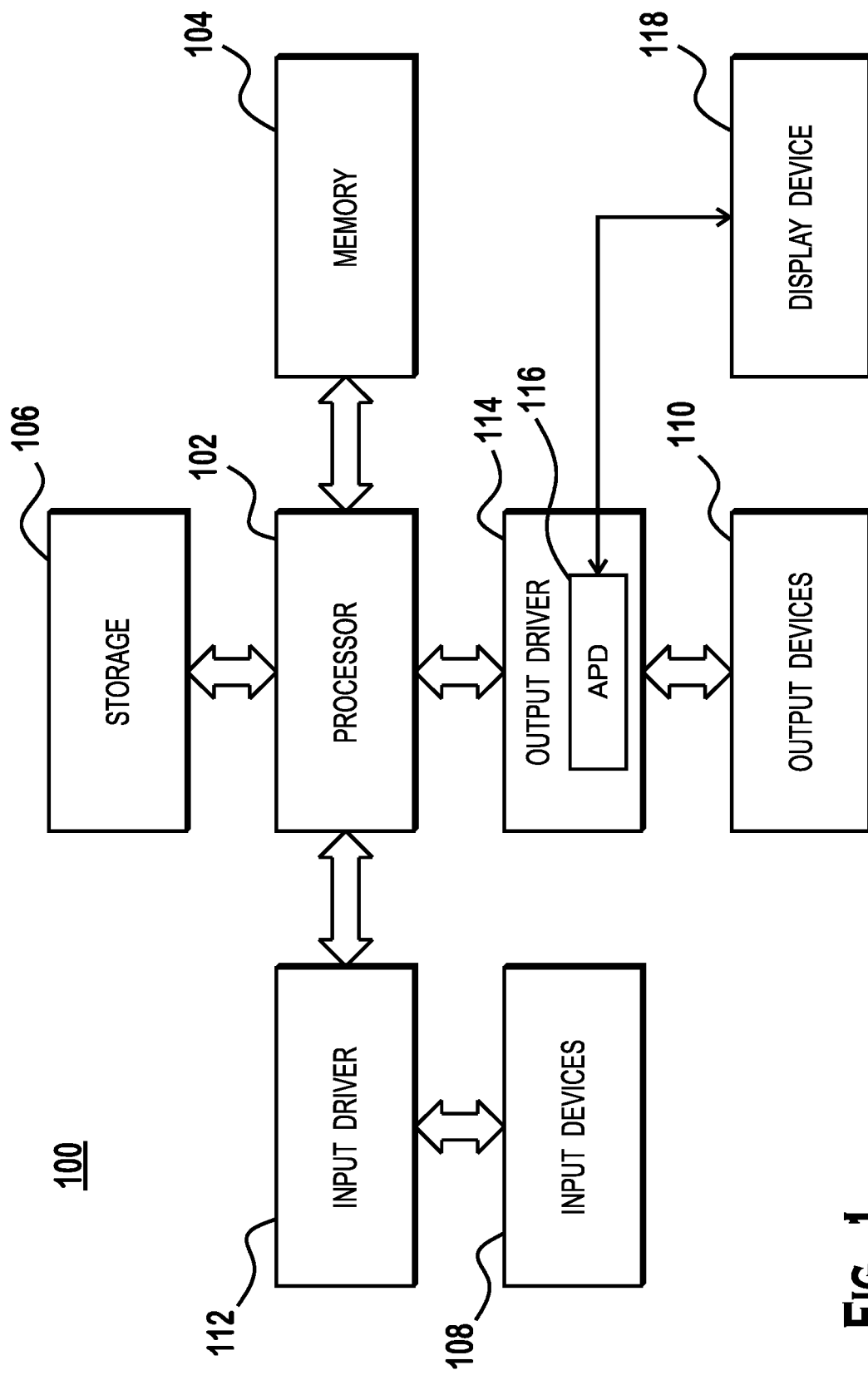
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
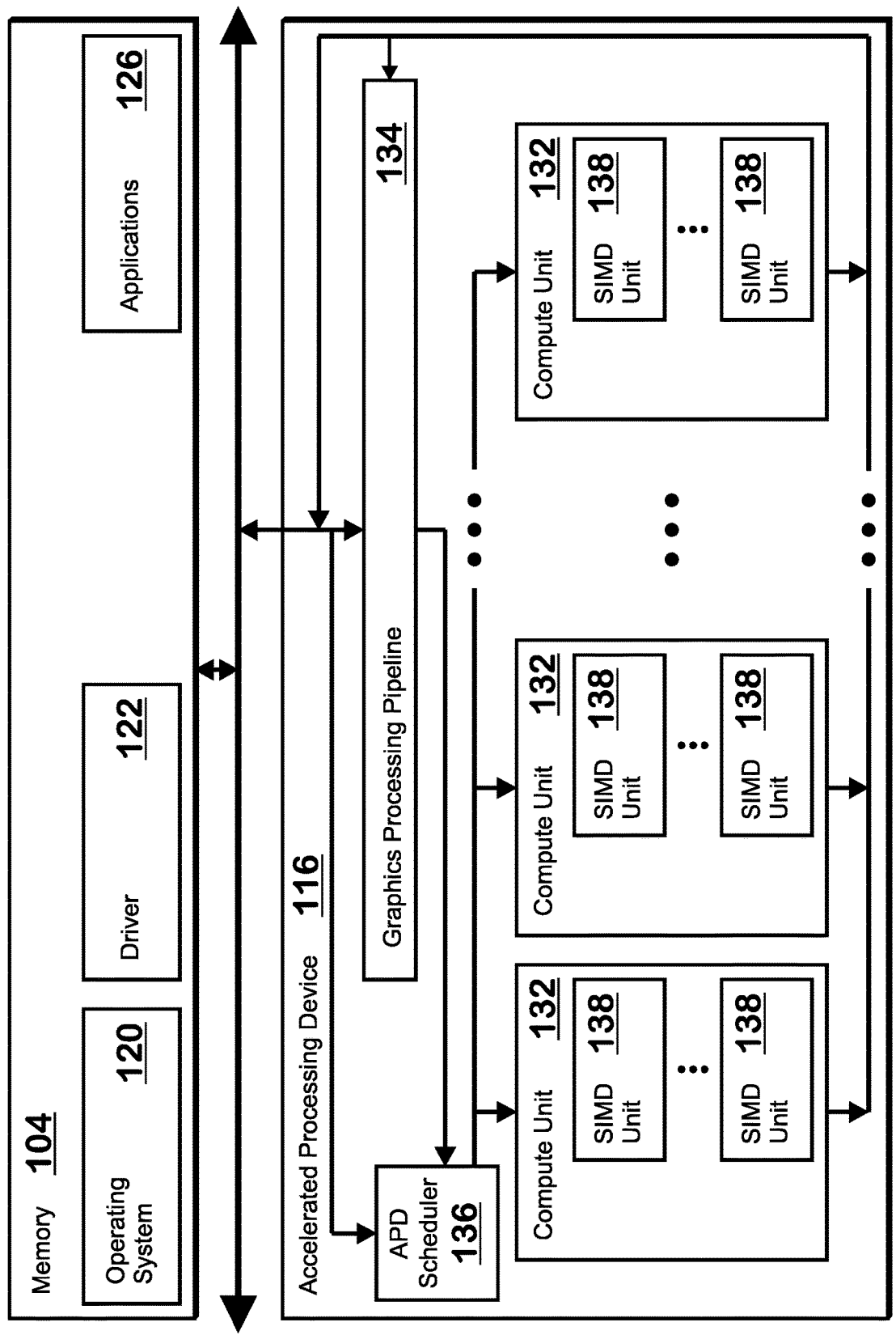
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The basic unit of execution in compute units 132 is a work-item. Each work-item represents a single instantiation of a program that is to be executed in parallel in a particular lane. Work-items can be executed simultaneously (or partially simultaneously and partially sequentially) as a "wavefront" on a single SIMD processing unit 138. One or more wavefronts are included in a "work group," which includes a collection of work-items designated to execute the same program. A work group can be executed by executing each of the wavefronts that make up the work group. In alternatives, the wavefronts are executed on a single SIMD unit 138 or on different SIMD units 138. Wavefronts can be thought of as the largest collection of work-items that can be executed simultaneously (or pseudo-simultaneously) on a single SIMD unit 138. "Pseudo-simultaneous" execution occurs in the case of a wavefront that is larger than the number of lanes in a SIMD unit 138. In such a situation, wavefronts are executed over multiple cycles, with different collections of the work-items being executed in different cycles. An APD scheduler 136 is configured to perform operations related to scheduling various workgroups and wavefronts on compute units 132 and SIMD units 138.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs that define such computation tasks to the APD 116 for execution.

Figure 3:
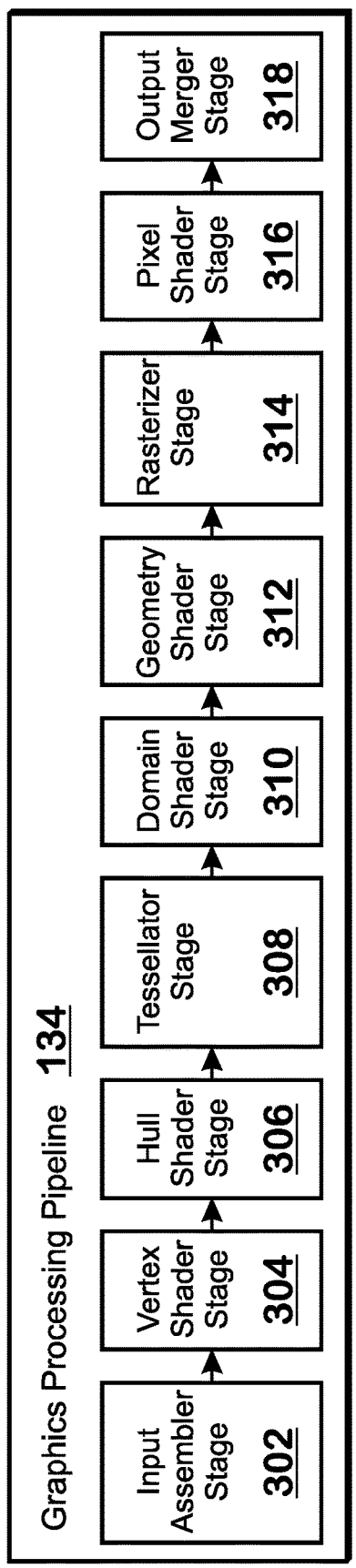
FIG. 3 is a block diagram showing additional details of the graphics processing pipeline illustrated in FIG. 2.

FIG. 3 is a block diagram showing additional details of the graphics processing pipeline 134 illustrated in FIG. 2. The graphics processing pipeline 134 includes stages that each performs specific functionality of the graphics processing pipeline 134. Each stage is implemented partially or fully as shader programs executing in the programmable compute units 132, or partially or fully as fixed-function, non-programmable hardware external to the compute units 132.

The input assembler stage 302 reads primitive data from user-filled buffers (e.g., buffers filled at the request of software executed by the processor 102, such as an application 126) and assembles the data into primitives for use by the remainder of the pipeline. The input assembler stage 302 can generate different types of primitives based on the primitive data included in the user-filled buffers. The input assembler stage 302 formats the assembled primitives for use by the rest of the pipeline.

The vertex shader stage 304 processes vertices of the primitives assembled by the input assembler stage 302. The vertex shader stage 304 performs various per-vertex operations such as transformations, skinning, morphing, and per-vertex lighting. Transformation operations include various operations to transform the coordinates of the vertices. These operations include one or more of modeling transformations, viewing transformations, projection transformations, perspective division, and viewport transformations, which modify vertex coordinates, and other operations that modify non-coordinate attributes.

The vertex shader stage 304 is implemented partially or fully as vertex shader programs to be executed on one or more compute units 132. The vertex shader programs are provided by the processor 102 and are based on programs that are pre-written by a computer programmer. The driver 122 compiles such computer programs to generate the vertex shader programs having a format suitable for execution within the compute units 132.

The hull shader stage 306, tessellator stage 308, and domain shader stage 310 work together to implement tessellation, which converts simple primitives into more complex primitives by subdividing the primitives. The hull shader stage 306 generates a patch for the tessellation based on an input primitive. The tessellator stage 308 generates a set of samples for the patch. The domain shader stage 310 calculates vertex positions for the vertices corresponding to the samples for the patch. The hull shader stage 306 and domain shader stage 310 can be implemented as shader programs to be executed on the compute units 132, that are compiled by the driver 122 as with the vertex shader stage 304.

The geometry shader stage 312 performs vertex operations on a primitive-by-primitive basis. A variety of different types of operations can be performed by the geometry shader stage 312, including operations such as point sprite expansion, dynamic particle system operations, fur-fin generation, shadow volume generation, single pass render-to-cubemap, per-primitive material swapping, and per-primitive material setup. In some instances, a geometry shader program that is compiled by the driver 122 and that executes on the compute units 132 performs operations for the geometry shader stage 312.

The rasterizer stage 314 accepts and rasterizes simple primitives (triangles) generated upstream from the rasterizer stage 314. Rasterization consists of determining which screen pixels (or sub-pixel samples) are covered by a particular primitive. Rasterization is performed by fixed function hardware.

The pixel shader stage 316 calculates output values for screen pixels based on the primitives generated upstream and the results of rasterization. The pixel shader stage 316 may apply textures from texture memory. Operations for the pixel shader stage 316 are performed by a pixel shader program that is compiled by the driver 122 and that executes on the compute units 132.

The output merger stage 318 accepts output from the pixel shader stage 316 and merges those outputs into a frame buffer, performing operations such as z-testing and alpha blending to determine the final color for the screen pixels.

Although described as including a graphics processing pipeline 134, it should be understood that the teachings of the present disclosure apply to devices that do not include a graphics processing pipeline 134 and/or that do not perform graphics operations.

The computer system 100 includes one or more components that perform convolutions. A convolution is an operation that is typically used in image processing for artificial neural networks. In an example, an input image is convolved with a convolution filter to produce an output image. The convolution filter has a set of weights and is applied to a set of pixels of the input image to generate a pixel of the output image. Applying the convolution filter includes multiplying each weight of the convolution filter with a corresponding pixel value of the input image to generate a set of partial products and summing the partial product to generate the pixel of the output image. Performing this operation many times generates an image.

Convolutions are often applied in a sequence of layers. It is possible for each layer to apply a different type of convolution, with different filters having different weights. Within a particular neural network, convolution layers are frequently separated by one or more non-convolutional layers, such as layers that perform non-neural-network based processing, or layers that perform neural network-based processing that does not involve convolutions.

Due to the above, processing neural networks that include convolutions, such as image processing networks, involves a computational scheme in which convolutional layers have dependencies on earlier convolutional layers. Handling such dependencies is important for processing efficiency, especially where it is desired to process such neural networks in parallel. Thus a scheme is provided herein for processing chains of convolutions in an efficient manner.

Figure 4:
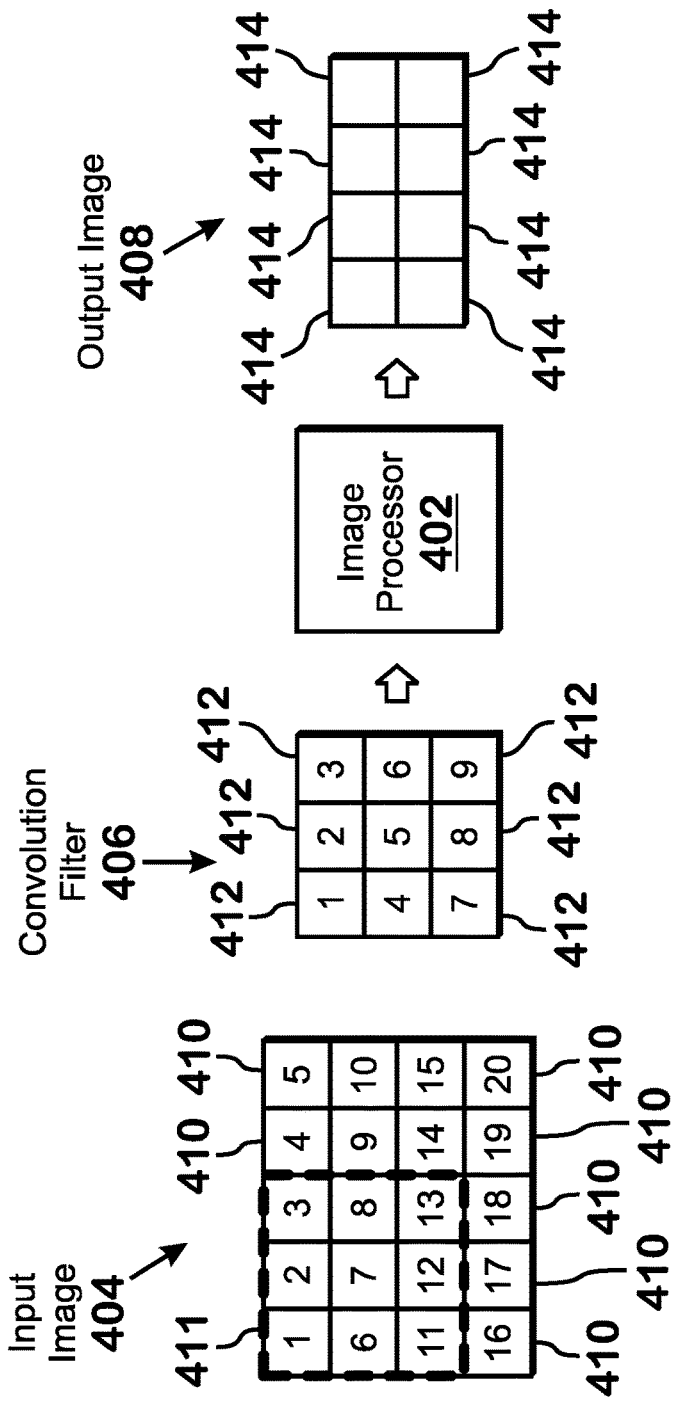
FIG. 4 illustrates convolution operations performed by an image processor, according to an example.

FIG. 4 illustrates convolution operations performed by an image processor 402, according to an example. The image processor is a hardware processor, software executing on a processor, or a combination thereof. In various examples, the image processor 402 is or includes software executing on the processor 102 or within the APD 116 (such as as a shader program executing on one or more compute units 132), or is partly hardware or fully included within a hardware component such as an input device 108, output device 110, the APD 116, the processor 102, or another hardware device.

An input image 404 is shown, including an array of pixels 410. Each of the small squares in FIG. 4 is a pixel, although for clarity, not all such squares are labeled with reference number 410. The convolution operation includes convolving the input with a convolution filter 406. The convolution filter 406 illustrated includes a set of weights 412. Again, although not all convolution filter weights are shown with reference number 412, it should be understood that each of the squares in the filter 406 is a convolution weight.

A convolution operation includes applying the filter 406 to the input image 404 to generate one or more pixels 414 of the output image 408. Specifically, an image processor 402 calculates a dot product of the filter weights with a filter cutout 411 of the input image 404. This dot product involves multiplying each filter weight 412 with a corresponding pixel of the input image 404 to generate a set of partial products, and summing all of those partial products to calculate the dot product result. This dot product result is a pixel 414 of the output image 408. In some examples, the filter weights 412 and the corresponding pixels 410 that are multiplied together to generate the partial products are geometrically correlated, belonging the same relative position within the convolution filter 406 and the filter cutout 411. For example, the top-left pixel 410 and the top-left weight 412 are multiplied together, then the pixel and weight to the right of that, then the top-right pixel 410 and top-right weight 412, and so on. To generate the entire output image 408, the image processor 402 adjusts the position of the filter cutout 411 in the input image 404, performing the above dot product for various possible positions. It should be understood that for a graphical image including multiple channels (e.g., with each channel corresponding to a different color component or other form of image subdivision), convolutions would be performed for multiple such color channels to generate multiple output image channels that together comprise the entire image.

The operations of FIG. 4 represent operations for one convolution layer. Within a neural network, multiple such operations are often performed, with the outputs from one convolutional layer being provided as input to another layer. Thus, it is often the case that one convolutional layer will produce data, as output image or images 408, that will be consumed by a subsequent convolutional layer (e.g., as input image or images 404 with or without additional processing applied). Parallelization can speed up processing such convolutions, but a naive approach to handling such dependencies with parallel processing has certain drawbacks. For example, in one such approach, the output images are divided by area. For example, one processing element processes the left most three columns of the output image, another processing element processes the next left most three columns, and so on. However, each such element would require at least some identical pixels, since a convolution to generate a pixel requires input from a surrounding area of the input image. Further, each additional convolutional layer represents an expanding area from input images at earlier levels, leading to a greater number of identical pixels being used. Use of these identical pixels as inputs to multiple processing elements means that a large amount of data must be transmitted to multiple processing elements multiple times. This "redundant" copying of data to multiple processing elements represents an inefficiency. Techniques are provided herein to reduce this inefficiency.

Figure 5:
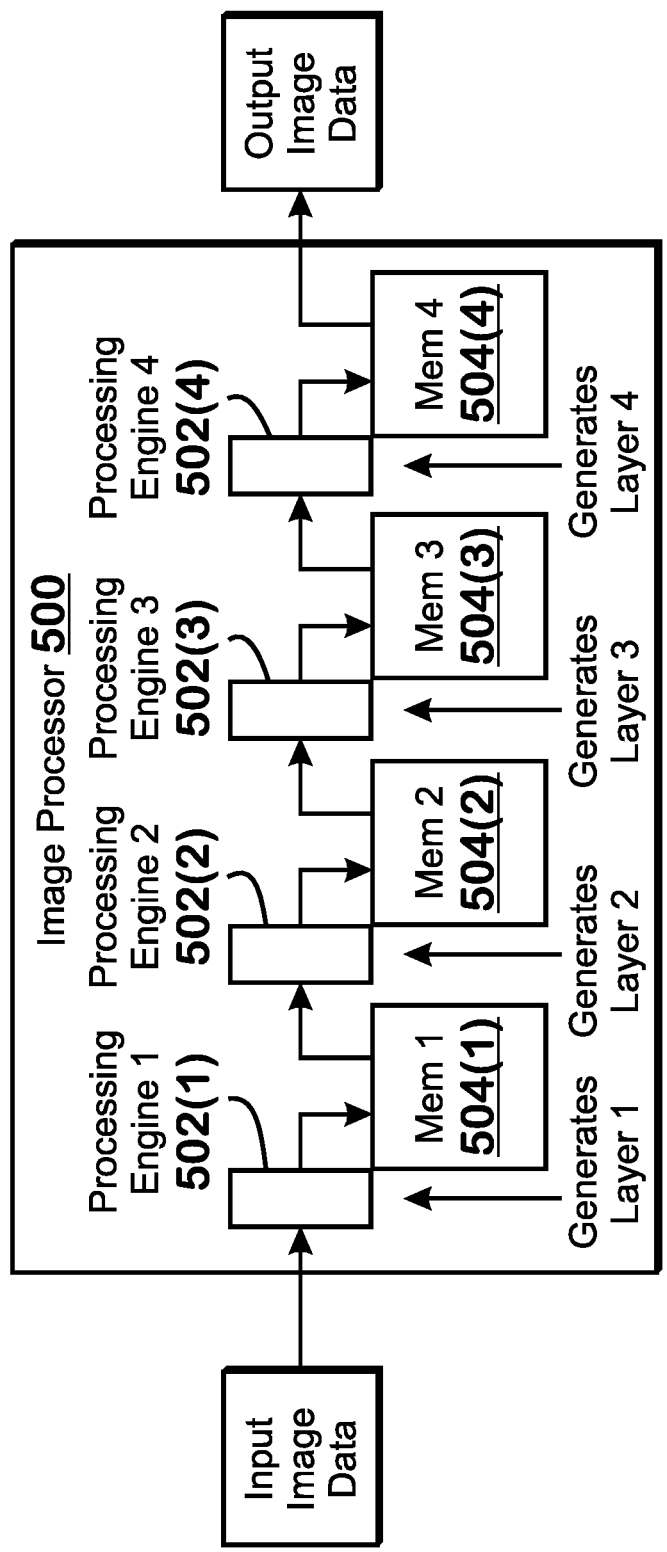
FIG. 5 illustrates an image processor, according to an example.

FIG. 5 illustrates an image processor 500, according to an example. The image processor includes a plurality of processing engines 502. The illustrated processing engines 502 operate in parallel on a different convolutional layer. In some implementations, discussed in greater detail elsewhere herein, multiple processing engines operate in a set on a particular layer, and each different set of processing engines processes a different convolutional layer. Processing a convolutional layer means performing convolutions on an input image to generate an output image. Each processing engine 502 operates on input data to generate an image for the next layer. For example, processing engine 502(1) processes an image from layer 0 to generate an image for layer 1, processing engine 2 502(2) processes an image for layer 1 to generate layer 2, processing engine 3 502(3) processes an image for layer 2 to generate layer 3, and processing engine 4 502(4) processes an image for layer 3 to generate layer 4.

By parallelizing the processing temporally rather than spatially, the image processor 500 avoids the duplication of data across multiple processing engines. More specifically, with processing engines processing different layers, the processing engines do not read any of the same data, although it is possible that one processing engine 502 reads the data output by another processing engine 502 (e.g., in the case that one processing engine 502 is processing one layer and another processing engine 502 is processing the next layer).

In addition to the above, instead of placing the results from one processing engine 502 into general memory, the image processor 500 places results from one processing engine 502 into a memory 504 dedicated for a particular layer. For example, memory 1 504(1) stores the image for layer 1, memory 2 504(2) stores the image for layer 2 504(2), memory 3 504(3) stores the image for layer 3 504(3), and memory 4 504(4) stores the image for layer 4 504(4). In implementations in which multiple processing engines 502 work on the same layer, each processing engine that works on the same layer would store output in the same memory 504.

In some implementations, one or more memory elements 504 includes or is coupled to a non-convolutional processing element. In various examples, such non-convolutional processing elements are a hard-wired circuit, a processor executing software, or a combination thereof. Such non-convolutional processing element performs non-convolutional operations, to modify an image generated by one processing engine 502 to another image to be used by another processing engine 502, according to a neural network architecture. For example, if a convolutional layer in a neural network is followed by one or more layers that do not perform convolutions, the non-convolutional processing engines perform the operations for such layers. In some examples, such processing engines read the data from the appropriate memory 504, process that data according to the corresponding operations of the neural network, and write the data back to the memory 504 for use by the next processing engine 502.

Figure 6:
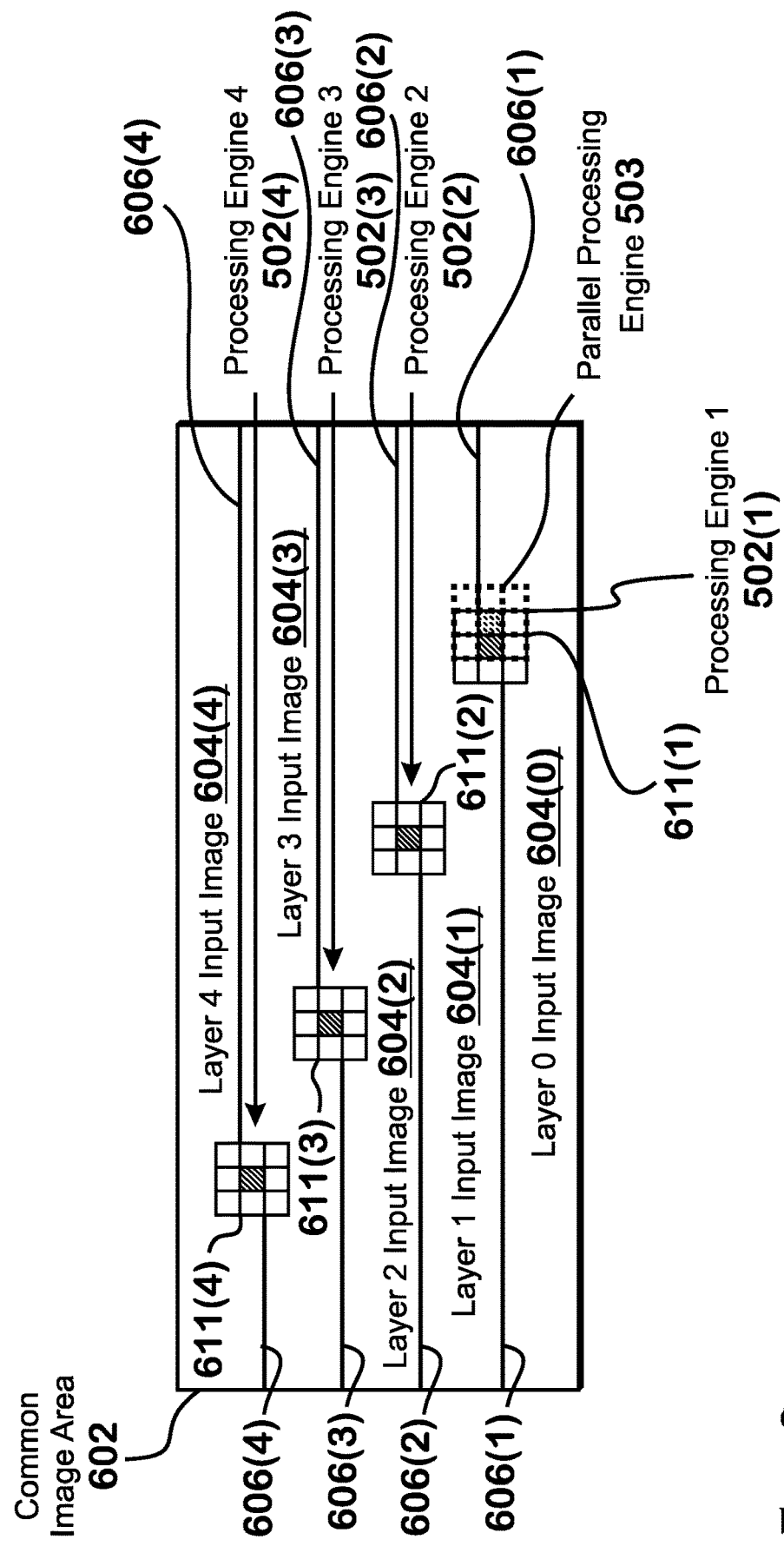
FIG. 6 illustrates the order of processing for the processing engines 502, according to an example.

FIG. 6 illustrates the order of processing for the processing engines 502, according to an example. A common image area 602 illustrates an area shared by the input images 604 for each of the convolutional layers of a neural network. Each of the images 604, except for the layer 0 input image 604(0) has a completed portion and an uncompleted portion. Bottom borders 606 illustrate the border between the completed portion and the uncompleted portion for an input image 604 for a corresponding layer. Bottom border 606(1) illustrates the border between the completed portion of the input image 604(1) for layer 1, which is above the border 606(1) and the uncompleted portion of the input image 604(1) for layer 1, which is below the border 606(1). Similarly, bottom border 606(2) illustrates the division between the completed portion of the input image 604(2) for layer 2 (above the border 606(2)) and the uncompleted portion of the input image 604(2) for layer 2 (below the border 606(2)). Border 606(3) and border 606(4) similarly divide the completed portion and the uncompleted portion of input image 604(3) and input image 604(4), respectively. Note that each border 606 has a left portion and a right portion. The left portion is to the left of a respective filter cutout position 611 and the right portion is to the right of a respective filter cutout position 611. It should be understood that the input images 604 are illustrated in overlapping positions. For example, a top portion of input image 604(4) is shown as overlapping with a top portion of input image 604(3). This overlapping reflects that the input image 604(4) and the input image 604(3) have pixels in the same location of the common image area 602.

The processing engines 502 are each associated with current filter cutout positions 611. These current filter cutout positions 611 represent an example position of the cutout filter for a corresponding processing engine 502. Filter cutout position 611(1) corresponds to processing engine 502(1), filter cutout position 611(2) corresponds to processing engine 502(2), filter cutout position 611(3) corresponds to processing engine 502(3), and filter cutout position 611(4) corresponds to processing engine 502(4). The filter cutout positions 611 illustrate that processing engines 502 that operate on earlier convolutional layers operate ahead of processing engines 502 that operate on later convolutional layers. For example, the order of processing in FIG. 6 is from left to right and then from top to bottom. In other words, processing engines generate pixels for their layers from left to right in a row and in rows from top to bottom. This ordering occurs so that the processing engines for the later stages have pixels for which to perform convolutions. Specifically, if a processing engine 502 has not yet generated pixels of a layer that is input to a subsequent processing engine 502, then the subsequent processing engine cannot perform operations on that data. The filter cutouts 611 are shown as having a set of surrounding, unshaded pixels a shaded central pixel, which is the pixel generated by the convolution operation occurring at the location of the filter cutout 611. As described above, in between one processing engine 502 generating pixels for an image and a subsequent processing engine 502 consuming those pixels, it is possible for non-convolutional processing engines to process those pixels in any technically feasible manner. As can be seen, the processing order of the processing engines 502 involves processing engines 502 for earlier layers performing processing "sufficiently ahead of" processing engines 502 for later layers. "Ahead of" here means in a later part of the processing order for the pixels in the image. For example, if the processing order is from left to right and top to down, "ahead of" means "more to the right of and further down than." A first processing engine 502 is "sufficiently ahead of" a second processing engine 502 if the first processing engine 502 has produced enough data that the second processing engine 502 can perform at least one convolution. It should be understood that the different processing engines are able to execute in parallel, meaning during the same time period. Thus it is possible for a processing engine 502 to generate pixels for one layer while a different processing engine 502 is generating pixels for a different layer.

It is described above that some processing engines 502 operate on different layers. It is also possible for some processing engines 502 to operate on the same layers. In general, a scheme for two or more processing engines 502 to operate on the same layers involves separating such processing engines 502 by a certain number of pixels in the processing order. In general, in such circumstances, each processing engine 502 working on the same layer skips generating the pixel generated by the other processing engines 502 working on that layer. In some examples, the processing engines 502 operate with a stride, where the stride defines the number of pixels the processing engines 502 skip while generating pixels. In an example, the stride number is equal to the number of processing engines 502 working on the same layer. In an example, two processing engines 502 work on the same layer. In this example, each processing engine operates with a stride of two, so that each processing engine 502 generates every other pixel. In FIG. 6, a parallel processing engine 503 is shown. The parallel processing engine 503 generates pixels for layer 1, similarly to processing engine 502(1). The parallel processing engine 503 is the same thing as a processing engine 502—the reference number 503 is used to indicate that this is a processing engine 502 operating in parallel to the other processing engine 502(1) generating pixels for layer 1. In this example, parallel processing engine 503 generates pixels that are "one pixel ahead" of the pixels generated by processing engine 502(1). Thus, both processing engine 1 502(1) and parallel processing engine 503 operates with a stride of two. It is possible for processing engines 502 to process the same layer in parallel according to any technically feasible scheme, and it is possible for any number of processing engines 502 to be processing any given layer in parallel for each layer. For example, it is possible for two processing engines 502 to be generating layer 1 while three processing engines 502 generate layer 2, four processing engines 502 generate layer 3, and so on.

Figure 7:
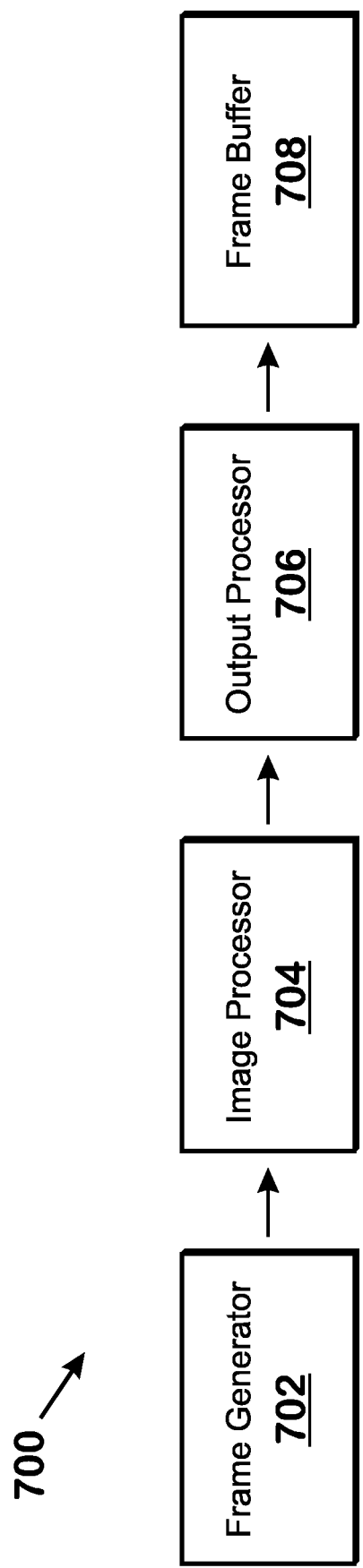
FIG. 7 illustrates an in-line architecture of an image processor, according to an example.

FIG. 7 illustrates an in-line architecture 700 for an image processor, according to an example. The in-line architecture 700 includes a frame generator 702, an image processor 704, an output processor 706, and a frame buffer 708. As shown, the image processor 704 is in-line with a frame generator 702. In some examples, the frame generator is a graphics or video engine (such as the APD 116 or graphics processing pipeline 134) that generates a frame of graphics or video. In various examples, the frame generator additionally performs operations such as scaling, color processor, blending, and, optionally, other operations on the frame.

The image processor 704 is an image processor 500 of FIG. 5. The image processor 500 receives the processed frame and processes the image to generate an output image as described elsewhere herein. In some examples, the image processor 500 performs neural network-based image upscaling, utilizing the techniques disclosed herein. The image processor 704 provides the resulting modified image an output, such as to the output processor 706.

The optional output processor 706 receives the output of the image processor 704 and performs additional processing such as compressing the image and formatting the image for output. The processed image is then output for display. In one example, the resulting image is written to a frame buffer 708, which is a portion of memory in which a frame is stored for further processing such as reading out to a display. In another example, the resulting image is output directly to a display controller or other device that outputs the image to a display.

One benefit of the in-line architecture 700 is that the image processor 700 does not fetch data from a frame buffer using a direct memory access engine, process that data, and then return the data to the frame buffer. More specifically, in a non-in-line architecture, a frame generator (e.g., frame generator 702) would write a frame to a frame buffer. The image processor would then read the frame from the frame buffer, perform operations on that frame, and write the modified frame back to the frame buffer. By operating in-line with the display pipeline, traffic between the frame buffer and the image processor does not need to be managed, since the image processor receives input from one part of a pipeline and provides output to another part of the pipeline (for example, the image processor 704 receives a frame from the frame generator 702, performs operations such as upscaling on that frame, and outputs the result to the subsequent element such as the output processor 706). This action eliminates the latency of fetch from and storing to the frame buffer. In addition, because the image processor does not access large on-chip store such as one or more caches, power consumption is minimized. The operations of the image processor described herein, implemented in an in-line manner, minimizes processing latency and on-chip storage requirements as compared with a system in which a direct memory access engine is used to read from and write to a frame buffer.

Figure 8:
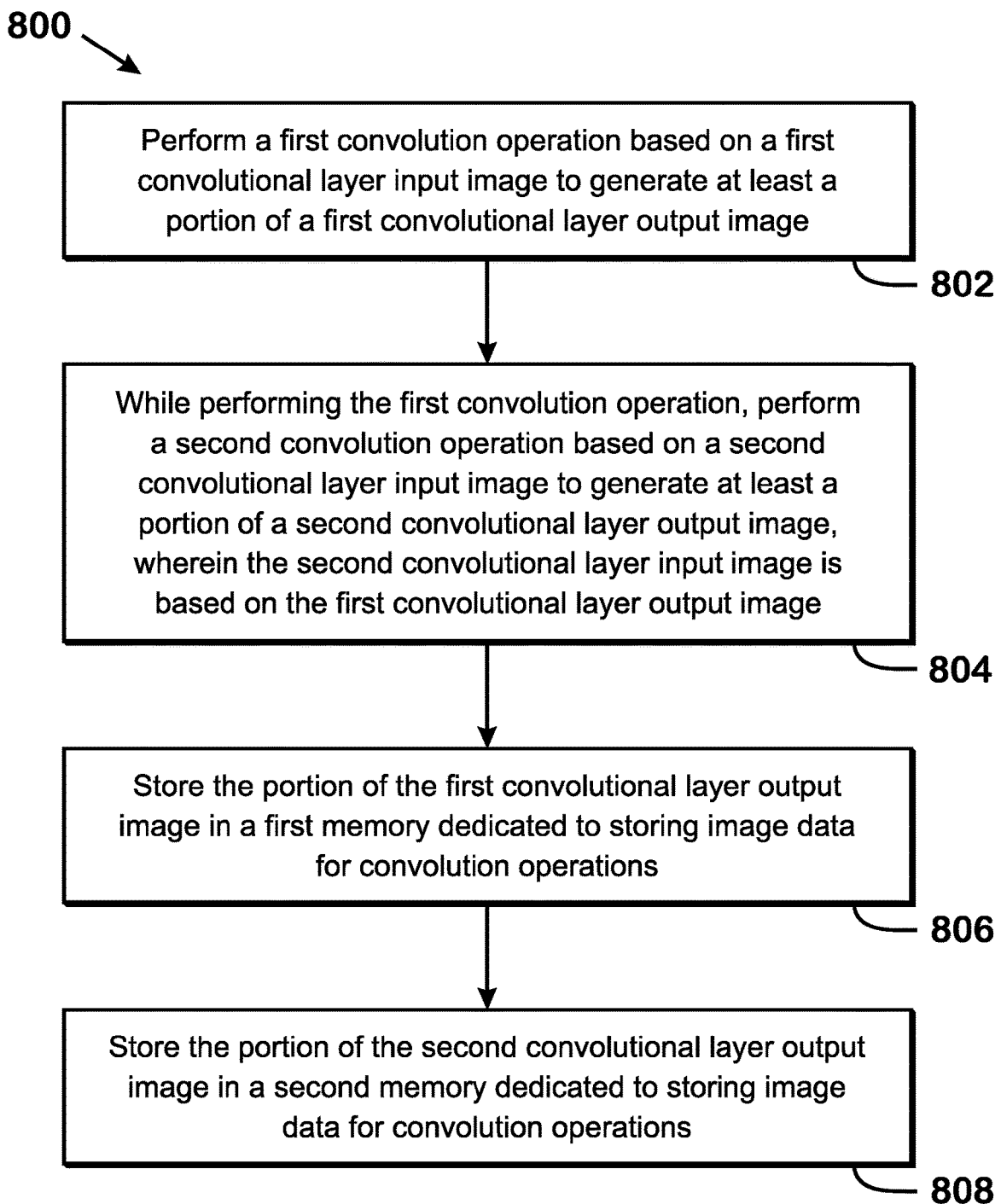
FIG. 8 is a flow diagram of a method for performing convolution operations, according to an example.

FIG. 8 is a flow diagram of a method 800 for performing convolution operations, according to an example. Although described with respect to the system of FIGS. 1-6, those of skill in the art will understand that any system configured to perform the steps in any technically feasible order falls within the scope of the present disclosure.

At step 802, a first processing engine 502 performs a first convolution operation based on a first convolutional layer input image to generate at least a portion of a first convolutional layer output image. In some examples, the convolution operation includes the operations described with respect to FIG. 4. The convolution operation includes convolving the weights of a convolution filter with pixels of the first convolutional layer input image within the filter cutout.

At step 804, while performing the first convolution operation, a second processing engine 502 performs a second convolution operation based on a second convolutional layer input image to generate at least a portion of a second convolutional layer output image. The second convolutional layer input image is based on the first convolutional layer output image. It should be understood that the exact data generated by the first convolution operation is not input for the second convolution operation. Instead, data that is based on a previously generated portion of the first convolutional layer output image is input for the second convolution operation. In other words, the first processing engine 502 is "operating ahead of" the second processing engine 502, as described elsewhere herein.

At step 806, the first processing engine 502 stores the portion of the first convolutional layer output image generated at step 802 in a first memory dedicated to storing image data for convolution operations. This memory is the memory 504 of FIG. 5. At step 808, the second processing engine 502 stores the portion of the second convolutional layer output image in a second memory dedicated to storing mage data for convolution operations.

It should be understood that in between outputting data from a layer and inputting data to a layer, various operations can be performed on the data, such as operations that would be included in a neural network. It should also be understood that the convolutional layers can be part of any image processing network, such as an image recognition network, a network that uses image recognition, a network for image upscaling, or any other type of network.

The various functional units illustrated in the figures and/or described herein (including, but not limited to, the processor 102, the input driver 112, the input devices 108, the output driver 114, the output devices 110, the APD 116, the APD scheduler 136, the graphics processing pipeline 134, the compute units 132, the SIMD units 138, each stage of the graphics processing pipeline 134 illustrated in FIG. 3, the image processor 402, image processor 500, the processing engines 502, and the memories 504) may be implemented as a general purpose computer, a processor, a processor core, or fixed function circuitry, as a program, software, or firmware, stored in a non-transitory computer readable medium or in another medium, executable by a general purpose computer, a processor, or a processor core, or as a combination of software executing on a processor or fixed function circuitry. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for performing convolution operations, comprising:
    performing a first convolution operation by a first processing engine based on a first input image to generate at least a portion of a first output image; and
    while performing the first convolution operation, performing a second convolution operation by a second processing engine on the first input image, the second convolution operation being performed ahead of the first convolution operation by a number of pixels based on a number of processing devices concurrently performing convolution operations for the first input image, wherein the second processing engine is configured to skip pixels processed by the first processing engine; and
    storing the portion of the first output image in a first memory dedicated to storing image data for convolution operations.

2. The method of claim 1, wherein the number of pixels comprises a stride.

3. The method of claim 1, further comprising performing non-convolutional operations on data of the first output image to generate data of a second input image.

4. The method of claim 3, further comprising:
    while performing the first convolution operation, performing a third convolution operation based on a second input image to generate at least a portion of a second output image, wherein the second input image is based on the first output image.

5. The method of claim 1, wherein a first number of processing engines process the first input image while a second number of processing engines process the second input image.

6. The method of claim 5, wherein the first convolution operation and the second convolution operation are part of an in-line architecture.

7. The method of claim 1, wherein:
    the number of pixels is equal to a number of processing engines concurrently processing the first input image.

8. A system for performing convolution operations, comprising:
    a set of memories; and
    a set of processing engines coupled to the set of memories, the set of processing engines configured to:
        perform a first convolution operation by a first processing engine based on a first input image to generate at least a portion of a first output image; and
        while performing the first convolution operation, perform a second convolution operation by a second processing engine on the first input image, the second convolution operation being performed ahead of the first convolution operation by a number of pixels based on a number of processing devices concurrently performing convolution operations for the first input image, wherein the second processing engine is configured to skip pixels processed by the first processing engine; and
        store the portion of the first output image in a first memory dedicated to storing image data for convolution operations, the first memory being part of the set of memories.

9. The system of claim 8, wherein the number of pixels comprises a stride.

10. The system of claim 8, wherein the set of processing engines is further configured to:
    perform non-convolutional operations on data of the first output image to generate data of a second input image.

11. The system of claim 10, wherein the set of processing engines is further configured to:
    while performing the first convolution operation, perform a third convolution operation based on a second input image to generate at least a portion of a second output image, wherein the second input image is based on the first output image.

12. The system of claim 11, wherein a first number of processing engines process the first input image while a second number of processing engines process the second input image.

13. The system of claim 12, wherein the first convolution operation and the second convolution operation are part of an in-line architecture.

14. The system of claim 8, wherein:
    the number of pixels is equal to a number of processing engines concurrently processing the first input image.

15. A system, comprising:
    a frame generator; and
    an image processor inline with the frame generator, wherein the image processor is configured to:
        perform a first convolution operation by a first processing engine based on a first input image to generate at least a portion of a first output image; and
        while performing the first convolution operation, performing a second convolution operation by a second processing engine on the first input image, the second convolution operation being performed ahead of the first convolution operation by a number of pixels based on a number of processing devices concurrently performing convolution operations for the first input image, wherein the second processing engine is configured to skip pixels processed by the first processing engine; and store the portion of the first output image in a first memory dedicated to storing image data for convolution operations.

16. The system of claim 15, wherein the image processor is configured to receive frames from the frame generator without a direct memory access engine writing to a frame buffer.

17. The system of claim 15, wherein the image processor is configured to output a processed image for display without transmitting the processed image to a frame buffer.

* * * * *